United States Patent [19]

Chamberlain et al.

[11] Patent Number: 4,474,103
[45] Date of Patent: Oct. 2, 1984

[54] BRAKE BOOSTERS

[75] Inventors: Frederick A. W. Chamberlain, Warwick; David G. P. Morse, Leamington Spa, both of England

[73] Assignee: Automotive Products plc, Leamington Spa, England

[21] Appl. No.: 419,200

[22] Filed: Sep. 17, 1982

[30] Foreign Application Priority Data

Oct. 1, 1981 [GB] United Kingdom ............... 8129668

[51] Int. Cl.³ .............................................. F15B 9/10
[52] U.S. Cl. ..................................... 91/369 A; 60/554
[58] Field of Search ............ 91/369 A, 369 R, 369 B; 60/554, 552

[56] References Cited

U.S. PATENT DOCUMENTS 3,548,595 12/1970 Pech et al. ...................... 91/369 A
3,559,406 2/1971 Gardner ............................. 60/554
4,256,016 3/1981 Thomos ......................... 91/369 A

FOREIGN PATENT DOCUMENTS

| 937514 | 9/1963 | United Kingdom . |
| 964289 | 7/1964 | United Kingdom . |
| 1336870 | 11/1973 | United Kingdom . |
| 2034429 | 6/1980 | United Kingdom . |
| 2074270 | 10/1981 | United Kingdom ............ 91/369 A |
| 2084274 | 4/1982 | United Kingdom . |
| 2085987 | 5/1982 | United Kingdom . |
| 2086504 | 5/1982 | United Kingdom . |

Primary Examiner—Paul E. Maslousky
Attorney, Agent, or Firm—Kemon & Estabrook

[57] ABSTRACT

A brake booster has a reaction ring interposed between the usual valve body and rubber reaction ring. The ring may have a plurality of legs each with a hooked end to engage and retain the piston head of the input rod.

4 Claims, 4 Drawing Figures

BRAKE BOOSTERS

This invention relates to vacuum operated brake boosters particularly though not exclusively for use in motor vehicle brake systems. Such boosters reduce the vehicle driver braking effort required to generate a given braking effect.

Vacuum operated brake boosters usually comprise two annular dished pressings flanged together at their outer rims to form a hollow casing. The casing is divided into two chambers by a movable wall which houses a valve assembly arranged to control a differential pressure across the movable wall so as to provide a proportionate increase in output force from the booster for a given input force. The output force from the booster is reacted partly through the casing to the vehicle structure and partly through an input rod to the vehicle driver.

Apportionment of the output force is usually by rubber disc between an output rod on one side and the input rod and movable wall on the other side. The movable wall is almost always co-axial about the input rod.

One problem with prior art boosters is that the input rod is retained in a bore of the movable wall by a key inserted through a radial aperture of housing for the valve assembly and retained in place by the usual flexible diaphragm. Such a construction requires the booster to be assembled in a particular orientation so that the key does not drop out under the influence of gravity. Furthermore, it is desirable that the booster be installed in this orientation in a vehicle so that if the booster diaphragm becomes displaced in service, the key does not drop out and allow the input rod to become loose.

Another disadvantage of prior art boosters is that hitherto for each different size of booster a different movable wall and/or input rod has been required. Further changes have been necessary where for a given size of booster the ratio of output force reacted to the driver's brake pedal has been altered. This has increased the cost and inventory of parts for a range of boosters.

Furthermore, the material chosen for the movable wall must be satisfactory as a bearing material for the input rod.

It is the object of the present invention to overcome the aforementioned disadvantages and provide for an increased number of common parts for a range of different sizes of booster.

According to the invention there is provided a vacuum operated brake booster having an elastomeric disc for transmitting braking loads between, on one side an input member and a power driven movable wall, and on the other side an output member; said input member being reciprocal in a bore of the movable wall, characterised thereby that a reaction ring is housed in the movable wall for load transferring abutment between said elastomeric disc and said movable wall, the inner periphery of the ring forming a bearing surface for said input member.

Thus a wider choice of materials for the movable wall may be available since the bearing surface for the input rod is provided by the separate reaction ring.

Preferably the reaction ring has at least one leg extending axially away from the disc, said leg having an inwardly directed projection for retaining the input member in the reaction ring.

Other features of the invention are included in the following description of two preferred embodiments shown by way of example only in the accompanying drawings in which.

Figure 1:
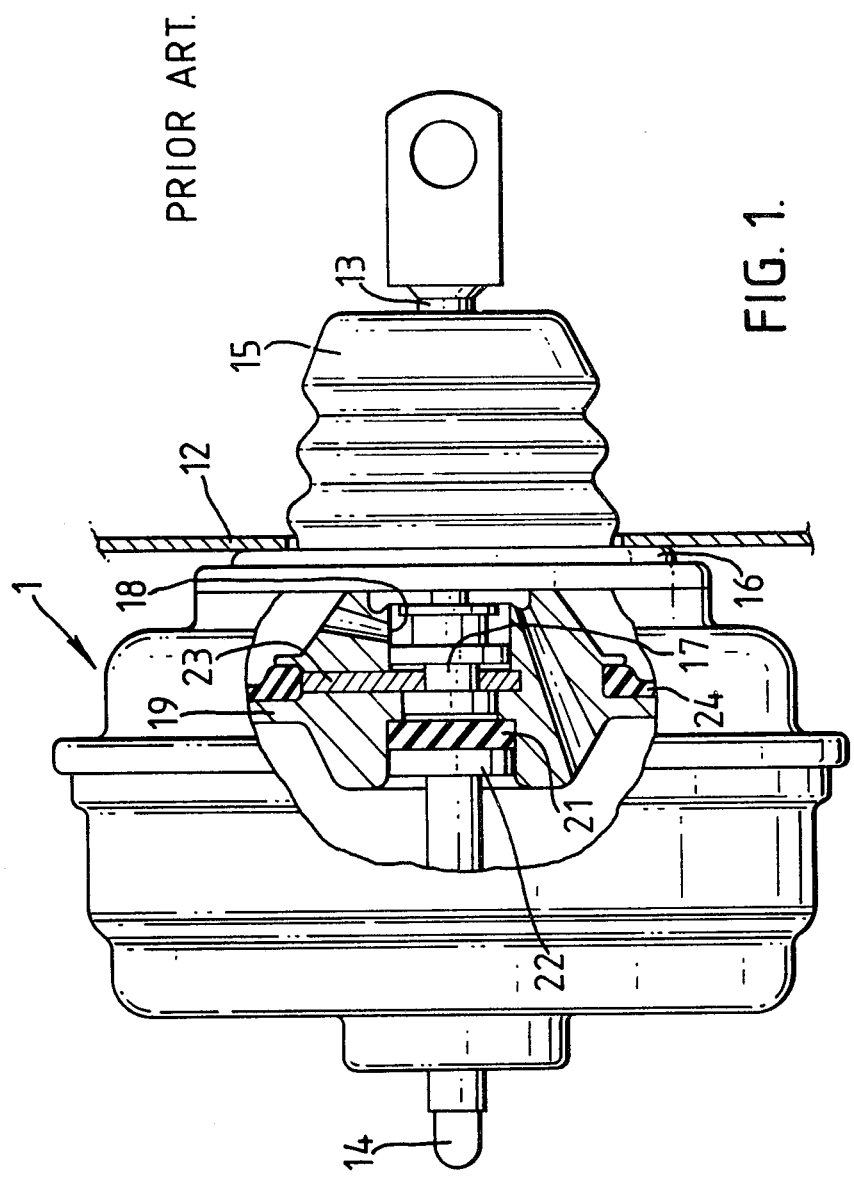
FIG. 1 is a side elevation of a booster with a scrap section therethrough showing details of a conventional booster arrangement.

With reference to FIG. 1 of the drawings, there is shown a brake booster 11 secured by bolts (not shown) to a vehicle bulkhead 12. The booster has the usual input rod 13 and output rod 14. A boot 15 for the input rod 13 and booster valve is thickened at one end 16 to form both a resilient mounting and a sealing gasket between the booster and the bulkhead.

The input rod 13 has a piston head 17 on one end thereof which slides in a bore 18 of a valve body 19 which forms part of the movable wall. The piston head 17 and body 19 both act on an elastomeric disc 21, the other side of which abuts a piston head 22 of the output rod 14.

The input rod 13 is retained by a forked key 23 inserted in a radial aperture of the valve body 19. The key is held in position by the usual diaphragm 24.

In use, inward movement of the input rod 13, on application of the driver's brake pedal, loads the piston head 22 through the disc 21. Relative movement of the input rod 13 to the wall 19 opens a boost valve (not shown) to create a differential pressure across the movable wall, the valve body 19 moving to supplement the load of the piston head 17 on the disc 21 and at the same time closing the boost valve. Thus for a given area ratio between the piston head and the movable wall the driver's input load is proportionately reduced dependant on the pressure differential across the wall.

Such an arrangement is very well known and is further described for example in British Pat. No. 964 289.

Figure 2:
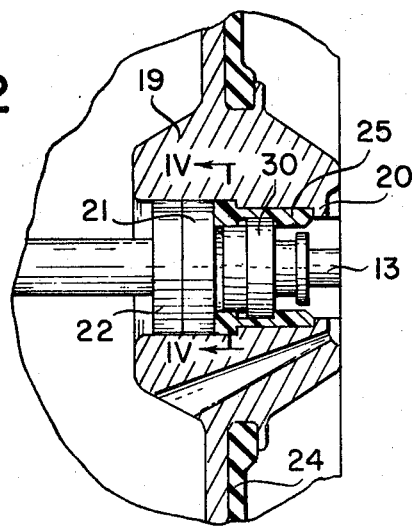
FIG. 2 is a scrap section through a booster corresponding to FIG. 1 and showing a first embodiment of the invention.
Figure 3:
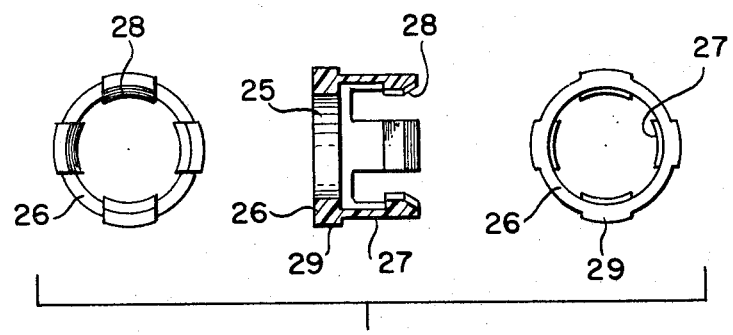
FIG. 3 shows a front view, an axial section through, and a view from behind of a reaction ring according to the first embodiment.
Figure 4:
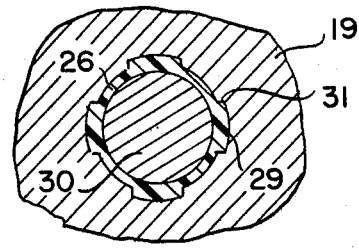
FIG. 4 is a scrap section on the line IV—IV of FIG. 2.

With reference to FIGS. 2 to 4 of the drawings, a separate reaction ring 25 is provided between the valve body 19 and the disc 21. The ring 25 comprises an annular portion 26 for abutment with the disc 21 and a plurality of legs 27 which transmit loads between the body 19 and disc 21 by abutment with a shoulder 20. The legs 27 each have hooked ends 28 which retain the input rod 13 in position. The ring 25 is made of a resilient plastics material. On assembly, the input rod 13 is passed through the valve body, from right to left as viewed, for the legs to be snapped over the input rod head. The rod 13 and ring 25 may then be drawn back into the valve body 19. Clearance is provided for the piston head 30 to move axially relative to the ring 25.

The annular portion 26 is provided with equispaced outwardly extending lugs 29, corresponding to the position of the legs 27, which engage co-operating recesses 31 of the valve body 19.

The lugs 29 both prevent relative rotation between the ring 25 and the valve body 19 and transmit part of the reaction load to the valve body which would otherwise be transmitted wholly through the legs 27. Relative rotation of the ring must be prevented to avoid blocking air passages of the valve body.

In this way the proportion of output load reacted to the driver's brake pedal can be easily altered by changing the size of reaction ring 25 for a given internal diameter of valve body 19 or outside diameter of piston head 30. Thus two valve bodies of different internal diameter and three sizes of piston head 30 will, with an appropriate reaction ring, give six combinations.

The sizes of piston head and reaction ring may be easily changed, the head 30 being typically turned from bar stock and the ring 25 moulded from plastics material, the bore of the ring being changed by insertion of an appropriate diameter plug in the ring mould.

A range of boosters may thus be provided having common control valves and valve bodies which are relatively expensive and complicated parts as compared with the reaction ring 25 and piston head 30.

We claim:

1. A vacuum operated brake booster comprising:
   a housing;
   a movable wall having a bore therein positioned in said housing;
   an input member having a piston head thereon slidable in said bore;
   an output member having a piston head thereon slidable in said bore;
   an elastomeric disc between said piston heads;
   and a reaction ring of a resilient plastics material in said bore, said reaction ring comprising an annular portion having an end face for abutment with said elastomeric disc, said ring functioning to transmit direct axial loads between the movable wall and said elastomeric disc, and including at least three legs extending axially from said annular portion, each of said legs having a hook end engaged by a snap fit behind the input member piston head.

2. A brake booster according to claim 1, wherein said legs abut a shoulder in said bore for transmission of direct axial loads between the movable wall and the elastomeric disc.

3. A brake booster according to claim 1, wherein the bore of said movable wall includes recesses and the ring includes angularly spaced radially outwardly directed projections which engage with said recesses.

4. A brake booster according to claim 3, wherein said projections are angularly aligned with the legs.

* * * * *